United States Patent [19]
Nagata et al.

[11] Patent Number: 5,953,075
[45] Date of Patent: Sep. 14, 1999

[54] VIDEO SIGNAL PROCESSING APPARATUS WITH MEANS FOR MAGNIFYING AND PROCESSING A PICTURE IMAGE CORRESPONDINGLY TO VIDEO SIGNALS

[75] Inventors: Tatsuo Nagata, Fujisawa; Takaaki Matono; Takeshi Sakai, both of Yokohama; Ryo Hasegawa, Kamakura; Koichi Sudo, Fujisawa, all of Japan

[73] Assignees: Hitachi, Ltd., Tokyo; Hitachi Video and Information System, Inc., Kanagawa-ken, both of Japan

[21] Appl. No.: 08/900,512

[22] Filed: Jul. 25, 1997

[30] Foreign Application Priority Data

Jul. 25, 1996 [JP] Japan .................. 8-196389

[51] Int. Cl.⁶ ............... H04N 9/74; H04N 3/223
[52] U.S. Cl. .................. 348/581; 348/561; 348/704
[58] Field of Search ................. 348/561, 581, 348/704; H04N 9/74, 3/223

[56] References Cited

U.S. PATENT DOCUMENTS 5,715,013  2/1998  Kang ........................ 348/561

FOREIGN PATENT DOCUMENTS 0 707 305  4/1996  European Pat. Off. .
0 709 825  5/1996  European Pat. Off. .

OTHER PUBLICATIONS

"Television Gijutsu Kyokasho (Television Technology Textbook)", first volume, edited by Japan Broadcasting Corp., pp. 31–91 and pp. 277–281.

"MUSE—Hi–Vision Transmission System" edited by Institute of Electronics, Information and Communication Engineers of Japan, pp. 1–8.

SID 96 Digest, vol. 27, May 12, 1996 entitled "Late–News Paper: Development of 13.3–in. Super TFT–LCD Monitor" by N. Kasai et al., pp. 414–417.

Primary Examiner—Sherrie Hsia
Attorney, Agent, or Firm—Evenson, McKeown, Edwards & Lenahan, PLLC

[57] ABSTRACT

The present invention relates to a video signal processing apparatus for converting video signals based on a desired transmission system such as NTSC, PAL, MUSE or any other system so as to conform to a display unit of a desired screen system such as XGA, VGA or the like. The apparatus has a feature that it is provided with a PLL circuit for changing a sampling frequency used by an analog-to-digital converter for converting inputted video signals into digital signals in accordance with the sort of the transmission system of the video signals, and a controller for controlling picture element interpolation of the digital signals performed by a picture image magnifying circuit for magnifying the video signals horizontally and vertically, in accordance with the sort of the transmission system of the video signals.

10 Claims, 9 Drawing Sheets

VIDEO SIGNAL PROCESSING APPARATUS WITH MEANS FOR MAGNIFYING AND PROCESSING A PICTURE IMAGE CORRESPONDINGLY TO VIDEO SIGNALS

BACKGROUND OF THE INVENTION

The present invention generally relates to a video signal processing apparatus used in an image display apparatus such as a television receiver, a display unit, or the like, and particularly relates to a video signal processing apparatus for converting video signals based on a desired transmission system such as NTSC, PAL, MUSE or any other system so as to conform to a display unit of a desired screen system such as XGA, VGA or the like.

Based on a transmission system of color television signals, conventional television broadcasting systems can be roughly classified into four systems including the NTSC system, the PAL system, the SECAM system and the MUSE system. The MUSE system of them is a band-compression transmission system developed for realizing Hi-Vision broadcasting, and hence designed to be able to manage a much larger information content than any of the other three standard transmission systems. For example, in comparison with the NTSC system adopted as a standard transmission system in Japan with the MUSE system, the information content managed by the latter is about five times as large as the information content managed by the former.

The transmission systems of color television signals described herein are described in detail in the following documents "Television Gijutsu Kyokasho (Television Technology Textbook)" the first volume, edited by Japan Broadcasting Corporation, published by Japan Broadcast Publishing Co., Ltd. (pp. 31 to 91), "MUSE—Hi-Vision Transmission System" edited by Institute of Electronics, Information and Communication Engineers of Japan, Published by Corona Publishing Co., Ltd. (pp. 1 to 8), and so on.

On the other hand, as for graphics in personal computers, video signals (hereinafter referred to as "personal computer video signals") and display units having different standards from one architecture to another are usually adopted. Video signals and display units based on any one standard of VGA mode (640×480 dots), SVGA mode (800×600 dots) and XGA mode (1024×768 dots) are usually adopted in most machine types.

Technology about display units described herein is disclosed in detail in the document "Television Gijutsu Kyokasho (Television Technology Textbook)" the first volume, edited by Japan Broadcasting Corporation, published by Japan Broadcast Publishing Co., Ltd. (pp. 277 to 281), as well as others.

A display unit for displaying images in a personal computer is usually mounted with a video signal processing apparatus for modulating the signal system of video signals supplied to the personal computer so as to conform to the standard of the display unit.

The basic structure of a conventional video signal processing apparatus will be described with reference to FIG. 9. As for the conventional technology described herein, it is assumed by way of example that a picture image represented by personal computer video signals of the VGA mode is displayed on the screen of a display unit (such as a liquid-crystal display unit) of the XGA mode. In this example, it is assumed that personal computer video signals having general standards (frame frequency fv is 59.94 Hz, horizontal frequency fh is 31.47 Hz, and resolution including a blanking period is 800 dots×525 dots) are used.

A conventional video signal processing apparatus has an input terminal 1 supplied with personal computer video signals from a video signal output apparatus, an A/D (analog-to-digital) converter 2 for digitally converting, with a predetermined sampling frequency (800×fh Hz), the personal computer video signals supplied through the input terminal 1, and a picture image magnifying circuit 901 for performing well-known picture element interpolation upon the personal computer video signals digitally converted by the A/D converter 2 so as to magnify a picture image represented by the personal computer video signals horizontally and vertically respectively at a predetermined ratio (1.6 times).

The personal computer video signals supplied from the picture image magnifying circuit 901 are supplied to a liquid-crystal display unit 8 as output signals of this video signal processing apparatus. As a result, a picture image represented by the personal computer video signals of the VGA mode are displayed properly on the screen of the liquid-crystal display unit 8 of the XGA mode.

As personal computers have come into wide use recently, image display units are being requested to be able to display with high quality both picture images from a personal computer and picture images of television signals. However, the above-mentioned video signal processing apparatus has a problem, in that it is impossible to deal with video signals (such as color television signals or the like) other than personal computer video signals properly. For example, when double-speed television signals of the NTSC system (field frequency fv is 59.94 Hz, horizontal frequency fh is 31.5 kHz, and resolution including a blanking period is 910×525 dots) or Hi-Vision signals of the MUSE system (field frequency fv is 60 Hz, horizontal frequency fh is 33.75 kHz, and resolution including a blanking period is 1920× 562.5 dots) are inputted, in an A/D converter 2, the video signals are digitally converted by the same sampling frequency (800×fh Hz) as that in the case where personal computer video signals are inputted. Accordingly, information included in the original color television signals is thinned out. Therefore, the resolution decreases to 800/910 when the double-speed television signals of the NTSC system are inputted, and the resolution decreases to 800/1920 when the Hi-Vision signals of the MUSE system are inputted.

Further, a picture image represented by the Hi-Vision signals of the MUSE system is reproduced as an unnaturally distorted image. That is, the aspect ratio of the screen of a standard display unit used for displaying picture images in a personal computer is 4:3 while the aspect ratio of the screen preferred for Hi-Vision signals of the MUSE system is 16:9. Therefore, the picture image is distorted by the difference in the aspect ratio between the two.

SUMMARY OF THE INVENTION

It is an object of the present invention to provide a video signal processing apparatus for converting video signals of a given transmission system such as NTSC, PAL, MUSE or the like so as to conform to a display unit of a desired screen system such as VGA, XGA or the like, so that both a picture image from a personal computer and a picture image of television signals can be displayed with high quality.

In order to attain the foregoing object, according to an aspect of the present invention, provided is a video signal processing apparatus comprising an analog-to-digital converter for sampling inputted video signals by a predetermined sampling frequency to convert the video signals into digital signals, and a picture image magnifying circuit for performing picture element interpolation upon output signals from the analog-to-digital converter to magnify the video signals vertically and horizontally, an output of the picture image magnifying circuit being supplied to a display unit, wherein the video signal processing apparatus further comprises:

(a) a PLL circuit for selecting, of dividing ratios predetermined correspondingly to the types of transmission systems of video signals, a dividing ratio corresponding to the transmission system of the video signals on the basis of an identification signal indicating the transmission system of the inputted video signals, dividing a reference frequency with the selected dividing ratio to make up a sampling frequency, and supplying the sampling frequency to the analog-to-digital converter; and (b) a controller having a table of magnification ratios predetermined correspondingly to the types of transmission systems of video signals and screen systems of the display unit, for selecting a magnification ratio corresponding to the transmission system of the video signals from the table on the basis of the identification signal, and controlling the picture element interpolation of the picture image magnifying circuit on the basis of the selected magnification ratio.

With such a configuration, the PLL circuit makes an output to the analog-to-digital converter while changing the sampling frequency on the basis of the type of the transmission system of the inputted video signals. It is therefore possible for the analog-to-digital converter to convert the video signals into digital signals without omitting information of the original video signals. Further, the number of picture elements of the video signals between horizontal lines and the number of picture elements between vertical lines are converted with a predetermined magnification ratio based on the screen system of the display unit and the transmission system of the video signals. It is therefore possible to convert video signals of a given transmission system so as to conform to a display unit of a desired screen system. Accordingly, by using this video signal processing apparatus, it is possible to reproduce a picture image, which is clear and has no sense of incompatibility, on the screen of the display unit.

DESCRIPTION OF THE PREFERRED EMBODIMENTS

Figure 1:
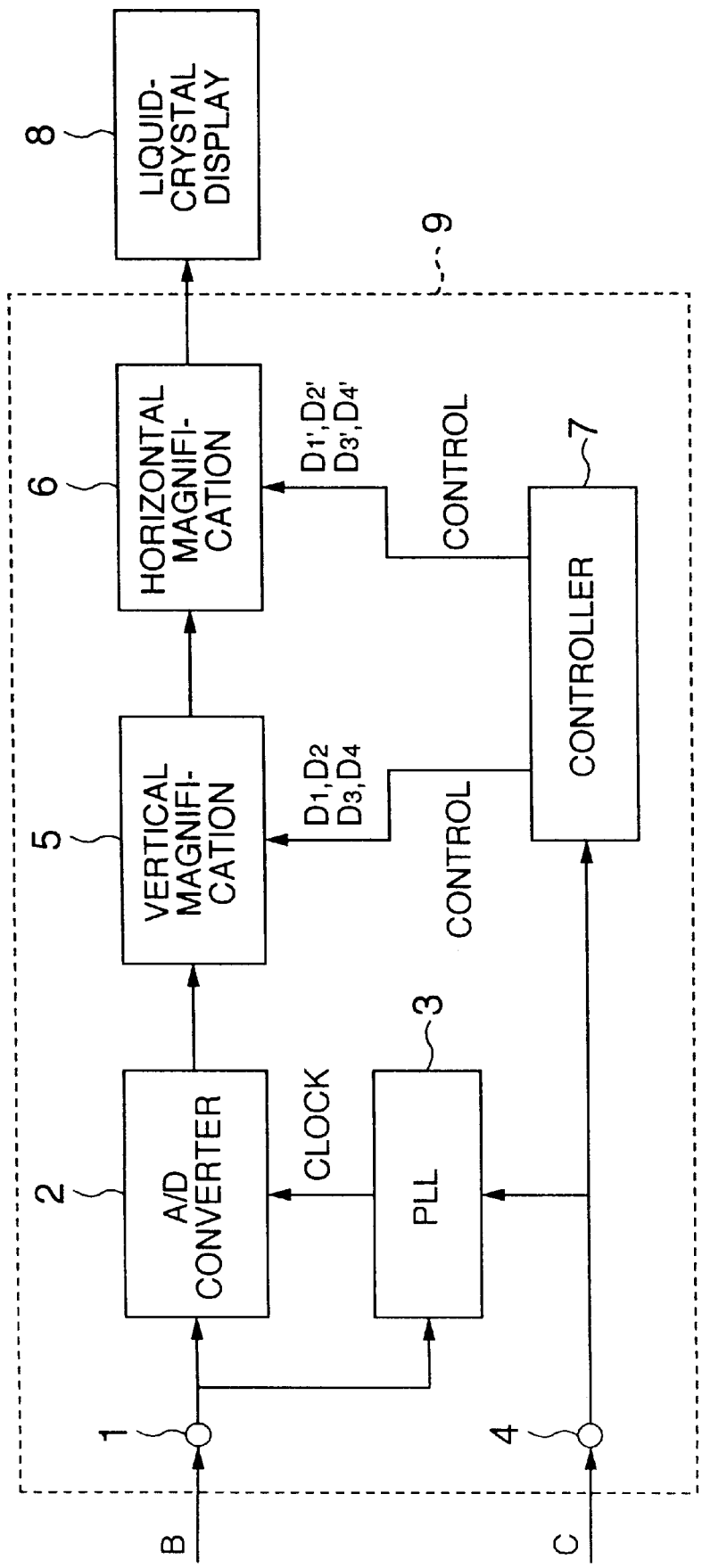
FIG. 1 is a block diagram illustrating an embodiment of a video signal processing apparatus according to the present invention in an image display system.

Embodiments of the present invention will be described in detail with reference to the accompanying drawings.

First, an embodiment of a video signal processing apparatus according to the present invention applied to an image display system will be described with reference to the block diagram shown in FIG. 1.

This image display system has a video signal output apparatus (not-shown) for outputting a video signal B of a desired transmission system, a liquid-crystal display unit 8 of a desired screen system, and a video signal processing apparatus 9 for converting the video signal B outputted from the video signal output apparatus. The screen system herein means the characteristics of the liquid-crystal display unit defined by the parameters such as the aspect ratio, the resolution, and so on.

The video signal processing apparatus 9, which is a featured part of this image display system, has a video signal input terminal 1 supplied with the video signal B outputted from the video signal output apparatus, an A/D converter 2 for digitally converting, with a desired sampling frequency, the video signal B supplied through the video signal input terminal 1, a PLL circuit 3 for forming the sampling frequency of the A/D converter 2, an input terminal 4 for receiving an identification signal C outputted from a predetermined external apparatus, a vertically magnifying circuit 5 for performing vertical magnification with a desired vertical magnification ratio upon the video signal B digitally converted by the A/D converter 2, a horizontally magnifying circuit 6 for performing horizontal magnification with a desired horizontal magnification ratio upon the video signal B vertically magnified by the vertically magnifying circuit 5, and a controller 7 for controlling the vertically magnifying circuit 5 and the horizontally magnifying circuit 6. The "identification signal C" herein means a signal for identifying type of transmission system of the video signal. For example, a signal generated with the operation for switching a video signal input terminal to input the video signal B therefrom (a signal transmitted from a remote controller operated by a user, or the like) is available as the identification signal C. Alternatively, it is not necessary to accept a signal transmitted by an external apparatus as the identification signal C when individual video signal input terminals are set so that each of the input terminals accepts only the input of the video signal B based on a predetermined transmission system. For example, the controller 7 itself may be designed so as to detect which video signal input terminal is accepting the input of the video signal B from a video signal output apparatus so that the controller 7 identifies the transmission system of the video signal B in accordance with the detection result.

The PLL circuit 3 built in the video signal processing apparatus 9 is designed so as to be locked in a horizontal synchronizing signal (or vertical synchronizing signal) of the video signal B supplied from the video signal input terminal 1 to thereby give a sampling frequency phase-locked with the video signal B of a desired transmission system. That is, the PLL circuit 3 identifies the transmission system of the video signal B supplied from the video signal output apparatus on the basis of the identification signal C supplied from the identification signal input terminal 4, so that the PLL circuit 3 can divide a reference frequency phase compared with the video signal B supplied from the video signal input terminal 1 by using a dividing ratio corresponding to the transmission system of the video signal B supplied from the video signal input terminal 1. Accordingly, the optimum sampling frequency to digitally convert the video signal B supplied from the video signal output apparatus (particularly preferably, a sampling frequency which is twice as high as the frequency of the video signal B, and lower than the horizontal frequency of a scanning line of the liquid-crystal display unit) is given to the A/D converter 2 in the latter stage. Therefore, there is no fear that the video signal processing apparatus 9 thins out information included in the video signal B, unlike the video signal processing apparatus described as a conventional one in the above "Background of the Invention section" (hereinafter referred to as "conventional video signal processing apparatus"). That is, the video signal processing apparatus 9 does not have the problem of reducing the resolution in the process of processing, unlike the conventional video signal processing apparatus.

Figure 2:
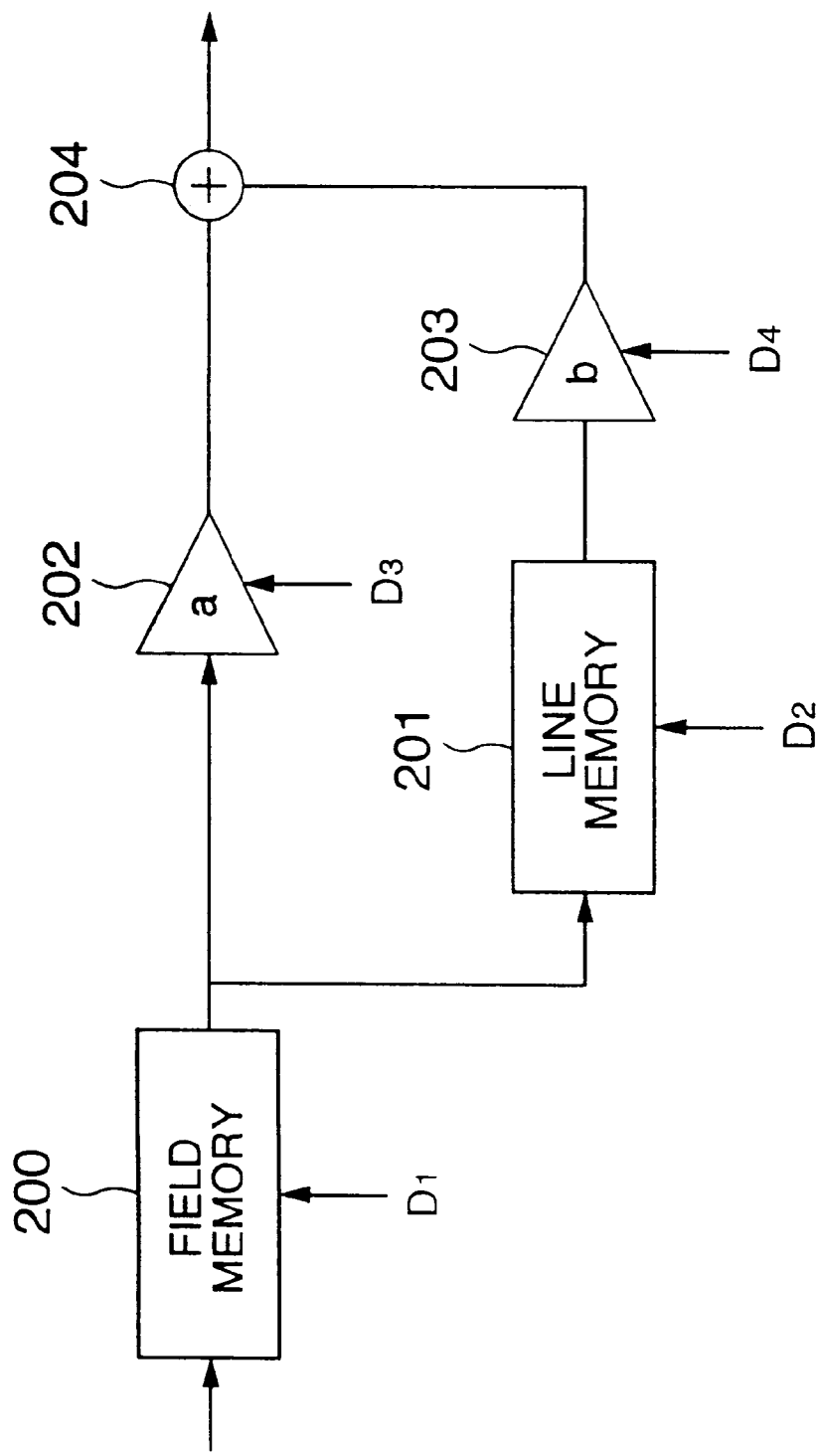
FIG. 2 is a diagram illustrating an example of a specific configuration of the vertically magnifying circuit 5 shown in FIG. 1.

Further, the vertically magnifying circuit 5 has a well-known circuit configuration in which interpolating picture elements are interpolated at a desired interpolation ratio between vertical lines of the video signal B digitally converted by the A/D converter 2. FIG. 2 shows a specific example of the circuit configuration. That is, the vertically magnifying circuit 5 is constituted by a field memory 200 for delaying the video signal B by one field, a line memory 201 for delaying the video signal B by one horizontal line, a coefficient multiplier 202 for multiplying one horizontal line of information of the video signal B stored in the field memory 200 by a coefficient a, a coefficient multiplier 203 for multiplying one horizontal line of information of the video signal B stored in the line memory 201 by a coefficient b, and an adder 204 for adding signals outputted from the two coefficient multipliers 202 and 203. Further, control commands D1 and D2 for controlling the timing of reads from and writes into the two memories 200 and 201, and control commands D3 and D4 for controlling the timings of switching the coefficients a and b used by the two coefficient multipliers 202 and 203 are given from the controller 7 which will be described later, respectively.

On the other hand, the horizontally magnifying circuit 6 has a well-known circuit configuration in which interpolating picture elements are interpolated at a desired interpolation ratio between horizontal lines of the video signal B outputted from the vertically magnifying circuit 5. The circuit configuration is almost the same as the circuit configuration of the vertically magnifying circuit 5 shown in FIG. 2. That is, the horizontally magnifying circuit 6 is constituted by a line memory for delaying the video signal B by one horizontal line, a picture element memory for delaying the video signal B by one picture element, a coefficient multiplier for multiplying one picture element of information of the video signal B stored in the line memory by a coefficient a', a coefficient multiplier for multiplying one picture element of information of the video signal B stored in the picture element memory by a coefficient b', and an adder for adding signals outputted from the two coefficient multipliers, respectively. Further, control commands D1' and D2' for controlling the timings of reads from and writes into the two memories, and control commands D3' and D4' for controlling the timing of switching the coefficients a' and b' used by the two coefficient multipliers are given from the controller 7 which will be described later, respectively, in the same manner as the vertically magnifying circuit 5.

When the identification signal input terminal 4 receives the identification signal C, the controller 7 first identifies the transmission system of the video signal B supplied from the video signal output apparatus on the basis of this identification signal C. Then, from a table prepared in advance, the controller 7 extracts a vertical magnification ratio K1 and a horizontal magnification ratio K2 corresponding to the screen system of the liquid-crystal display unit 8 presently connected and the transmission system of the video signal B identified here.

In the table herein, vertical magnification ratios and horizontal magnification ratios determined on the basis of experimental data and such and are recorded correspondingly to the screen systems of the liquid-crystal display unit and the transmission systems of the video signals, so that an optimum combination of the vertical magnification ratio and horizontal magnification ratio can be extracted from the table by use of the screen system of the liquid-crystal display units and the transmission system of the video signal as search keys. Using the vertical magnification ratio K1 extracted at this time, the controller 7 calculates the timing of reading from and writing into the field memory 200 and the line memory 201 of the vertically magnifying circuit 5, and the timing of switching the coefficients a and b used by the two coefficient multipliers 202 and 203, respectively. At the same time, by using the horizontal magnification ratio K2 extracted at this time, the controller 7 calculates the timing of reading from and writing into the line memory and the picture element memory of the horizontally magnifying circuit 6, and the timing of switching the coefficients a' and b' used by the two coefficient multipliers respectively. The controller 7 gives the above-mentioned control commands D1, D2, D3 and D4 to the vertically magnifying circuit 5 in accordance with the timing calculated with the vertical magnification ratio K1. Further, after that, the controller 7 gives the above-mentioned control commands D1', D2', D3' and D4' to the horizontally magnifying circuit 6 in accordance with the timing calculated with the horizontal magnification ratio K2.

In order to determine an optimum combination of the vertical magnification ratio and the horizontal magnification ratio in accordance with the type of transmission system of the video signal B which is being inputted at present and the screen system of the display unit which is being used at present, magnifying processing is executed properly in the vertically magnifying circuit 5 and the horizontally magnifying circuit 6 so that a difference can be canceled between the aspect ratio of the screen regarded as preferable for the video signal B which is being inputted from the video signal output apparatus and the aspect ratio of the screen of the liquid-crystal display unit 8 which is being used at present even if such a difference exists between the two aspect ratios. That is, in the case of use of the video signal processing apparatus 9, picture images without any distortion are always reproduced on the screen of the liquid-crystal display unit 8.

Since this image display system includes the video signal processing apparatus having such a function, the image display system can display picture images represented by video signals of any transmission system on a display unit of any screen system properly and clearly.

The description of the basic structure of the image display system according to this embodiment has been finished. The functions of the three circuits used in this embodiment, including the horizontally magnifying circuit, the vertically magnifying circuit and the controller, may be realized by a DSP, a microcomputer or the like. In addition, although a liquid-crystal display unit is used in this embodiment, effects similar to those in the case of using the liquid-crystal display unit can be obtained when the present invention is applied to any other display unit, such as an image display system including a plasma display unit or the like.

Figure 3:
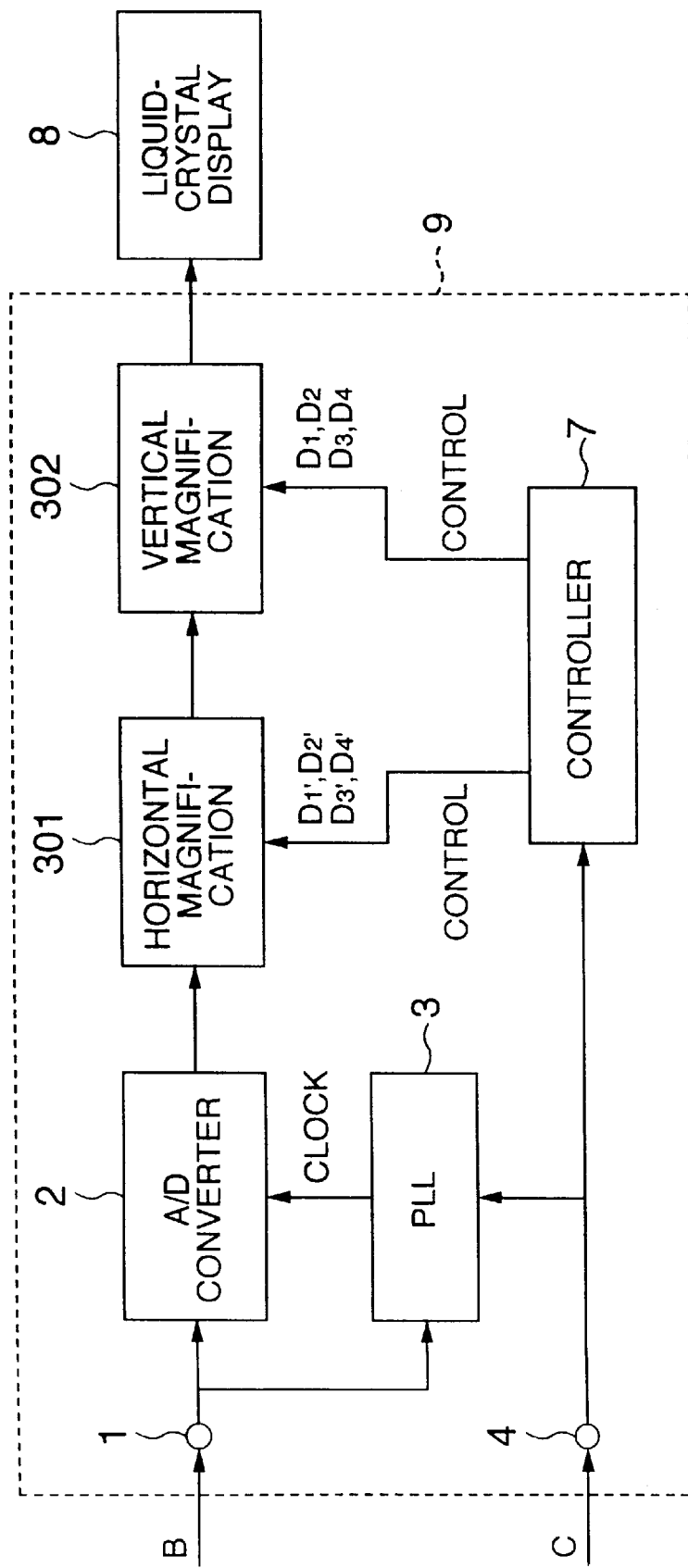
FIG. 3 is a block diagram illustrating another embodiment of a video signal processing apparatus according to the present invention in an image display system.

In this embodiment, after vertical magnification is first performed upon the video signal B digitally converted by the A/D converter 2, horizontal magnification is further performed. However, it is not always necessary to perform the magnifications in this order. For example, horizontal magnification may be performed, first, upon the video signal B digitally converted by the A/D converter 2, and thereafter vertical magnification may be further performed. That is, the circuit arrangement of the video signal processing apparatus 9, that is, the arrangement of a horizontally magnifying circuit 301 and a vertically magnifying circuit 302 may be changed as shown in FIG. 3. In this case, the controller 7 gives the above-mentioned control commands D1, D2, D3 and D4 to the vertically magnifying circuit 302 after giving the above-mentioned control commands D1', D2', D3' and D4' to the horizontally magnifying circuit 301.

Figure 4:
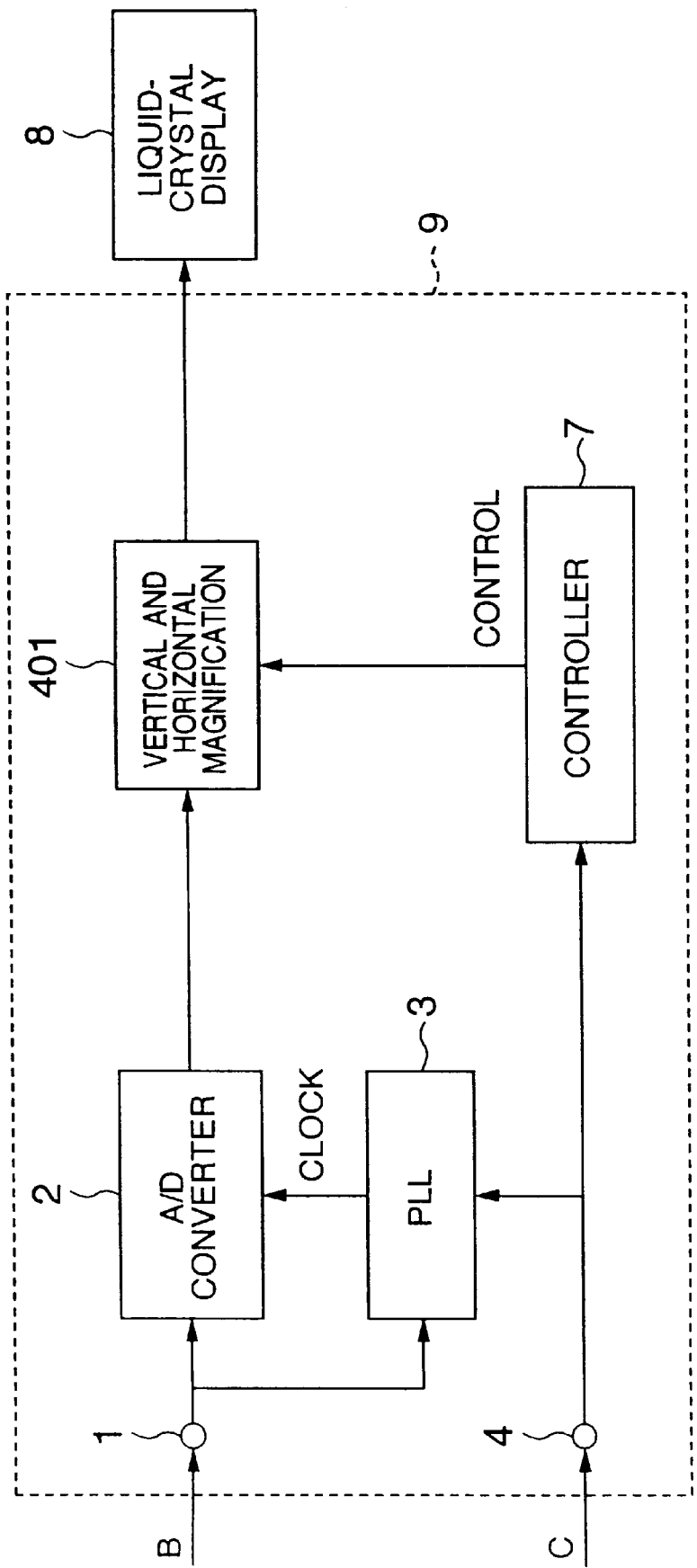
FIG. 4 is a block diagram illustrating further another embodiment of a video signal processing apparatus according to the present invention in an image display system.

Alternatively, as shown in FIG. 4, a vertically and horizontally magnifying circuit 401 for performing horizontal magnification and vertical magnification upon the video signal B simultaneously may be used instead of the vertically magnifying circuit and the horizontally magnifying circuit. The vertically and horizontally magnifying circuit 401 used here is mounted with a field memory, a line memory, a picture element memory, four coefficient multipliers and an adder in order to realize both the function belonging to the vertically magnifying circuit and the function belonging to the horizontally magnifying circuit simultaneously. In addition, in this case, the controller 7 supplies the vertically and horizontally magnifying circuit 401 with control commands for controlling the timings of reading from and writing into the three memories, and control commands for controlling the timings of switching coefficients used by the four coefficient multipliers.

The operation of the video signal processing circuit according to the present invention will be described below with a more specific example. Respective numerical values used herein are provided by way of example, only and numerical values different therefrom may be used in practice.

Assume that an XGA-mode liquid-crystal display unit and a video signal output apparatus which outputs personal computer video signals are connected to the video signal processing apparatus 9 in FIG. 1. When an identification signal C outputted from a predetermined external apparatus is inputted into the identification signal input terminal 4, the PLL circuit 3 and the controller 7 recognize that the video signal B inputted into the video signal input terminal 1 is a personal computer video signal on the basis of the identification signal C inputted into the identification signal input terminal 4.

Then, the PLL circuit 3 selects a first reference value (usually 7/25) which is made to correspond to the transmission system "personal computer video signal" of the video signal B which is being inputted at present, as the dividing ratio by which a reference frequency (usually 89.64 MHz) is divided. As a result, the optimum sampling frequency (800× fh Hz) for digitally converting personal computer video signals is given to the A/D converter 2.

Figure 5:
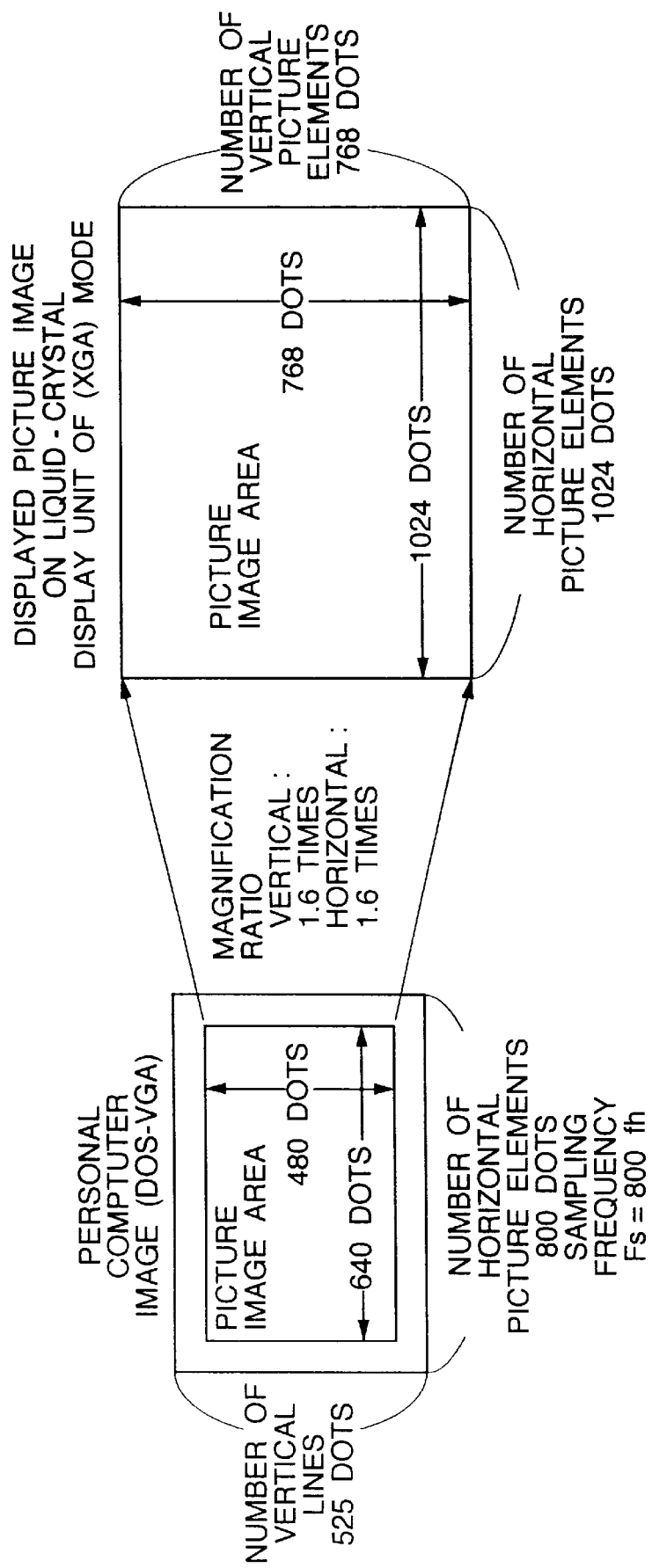
FIG. 5 is a diagram for explaining an example of horizontal magnification and vertical magnification when a VGA personal computer image is displayed on an XGA display unit by use of a video signal processing apparatus according to the present invention.

On the other hand, the controller 7 extracts, from the table provided in advance, the combination of the vertical magnification ratio K1 (768/480 times, that is, 1.6 times) and the horizontal magnification ratio K2 (1024/640 times, that is, 1.6 times) which are made to correspond to the screen system "XGA mode" of the liquid-crystal display unit which is connected at present and the transmission system "personal computer video signal B" of the video signal B which is being inputted at present. Then, the controller 7 supplies the above-mentioned control commands D1 and D2 to the vertically magnifying circuit 5 at the timing calculated on the basis of the vertical magnification ratio K1 (1.6 times). Thereafter, the controller 7 supplies the above-mentioned control commands D3 and D4 to the horizontally magnifying circuit 6 at the timing calculated on the basis of the horizontal magnification ratio K2 (1.6 times). As a result, by vertical magnification and horizontal magnification executed by the vertically magnifying circuit 5 and the horizontally magnifying circuit 6, a picture image represented by the personal computer video signal having a size suitable to its original predetermined display area (640×480 dots) is magnified to a size which is suitable to the display area (1024×768 dots) of the XGA-mode liquid-crystal display unit as shown in FIG. 5. That is, a personal computer image similar to a conventional one and having no sense of incompatibility is displayed on the XGA-mode liquid-crystal display unit.

Figure 6:
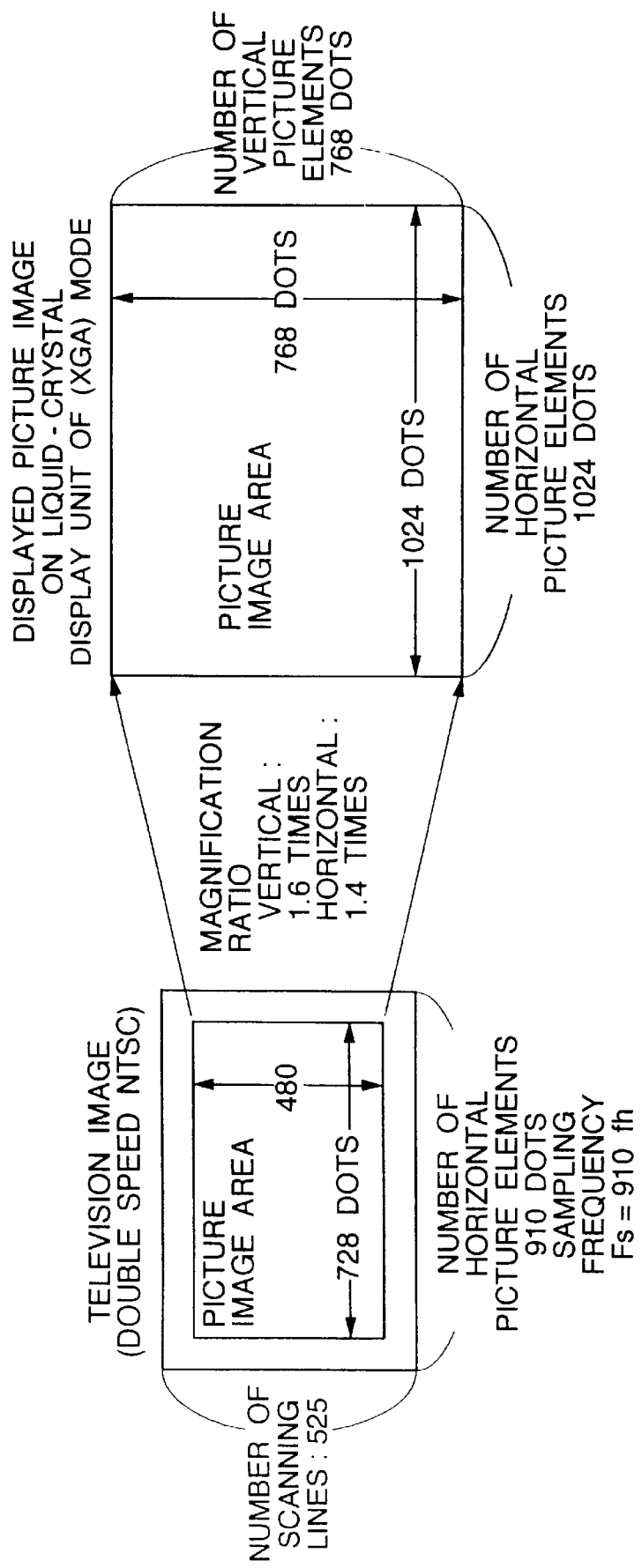
FIG. 6 is a diagram for explaining an example of horizontal magnification and vertical magnification when a double-speed NTSC television image is displayed on an XGA display unit by use of a video signal processing apparatus according to the present invention.

Now, instead of the video signal output apparatus outputting the personal computer video signals B, another video signal output apparatus outputting NTSC-system double-speed color television signals is connected to the video signal processing apparatus 9 in FIG. 1. When an identification signal C outputted from a predetermined external apparatus is inputted into the identification signal input terminal 4 thereafter, the PLL circuit 3 and the controller 7 recognize that the video signal B inputted into the video signal input terminal 1 has been changed to the NTSC-system double-speed color television signal, on the basis of the identification signal C inputted into the identification signal input terminal 4. Consequently, the PLL circuit 3 selects a second reference value (usually 8/2) which is made to correspond to the transmission system "NTSC-system double-speed color television signal" of the video signal B which is being inputted at present, as the dividing ratio by which the reference frequency (usually 89.64 MHz) is divided. As a result, the optimum sampling frequency (910× fh Hz) for digitally converting NTSC-system double-speed color television signals, that is, a sampling frequency by which information included in the original video signal will not be thinned out is newly supplied to the A/D converter 2. On the other hand, the controller 7 extracts, from the table provided in advance, the combination of the vertical magnification ratio K1 (768/480 times, that is, 1.6 times) and the horizontal magnification ratio K2 (1024/728 times, that is, 1.4 times) which are made to correspond to the screen system "XGA mode" of the liquid-crystal display unit which is connected at present and the transmission system "NTSC-system double-speed color television signal" of the video signal B which is being inputted at present. Then, the controller 7 supplies the above-mentioned control commands D1 and D2 to the vertically magnifying circuit 5 at the timing newly calculated on the basis of the vertical magnification ratio K1 (1.6 times). Thereafter, the controller 7 supplies the above-mentioned control commands D3 and D4 to the horizontally magnifying circuit 6 at the timing newly calculated on the basis of the horizontal magnification ratio K2 (1.4 times). As a result, by vertical magnification and horizontal magnification executed by the vertically magnifying circuit 5 and the horizontally magnifying circuit 6 respectively, a picture image represented by the NTSC-system double-speed color television signal having a size which is suitable to its original predetermined display area (728×480 dots) is magnified to a size which is suitable to the display area (1024×768 dots) of the XGA-mode liquid-crystal display unit as shown in FIG. 6. That is, a television image which is clear and has no sense of incompatibility is displayed on the XGA-mode liquid-crystal display unit even if the transmission system of the video signal B inputted therein is changed to the NTSC-system double-speed color television signal.

Figure 7:
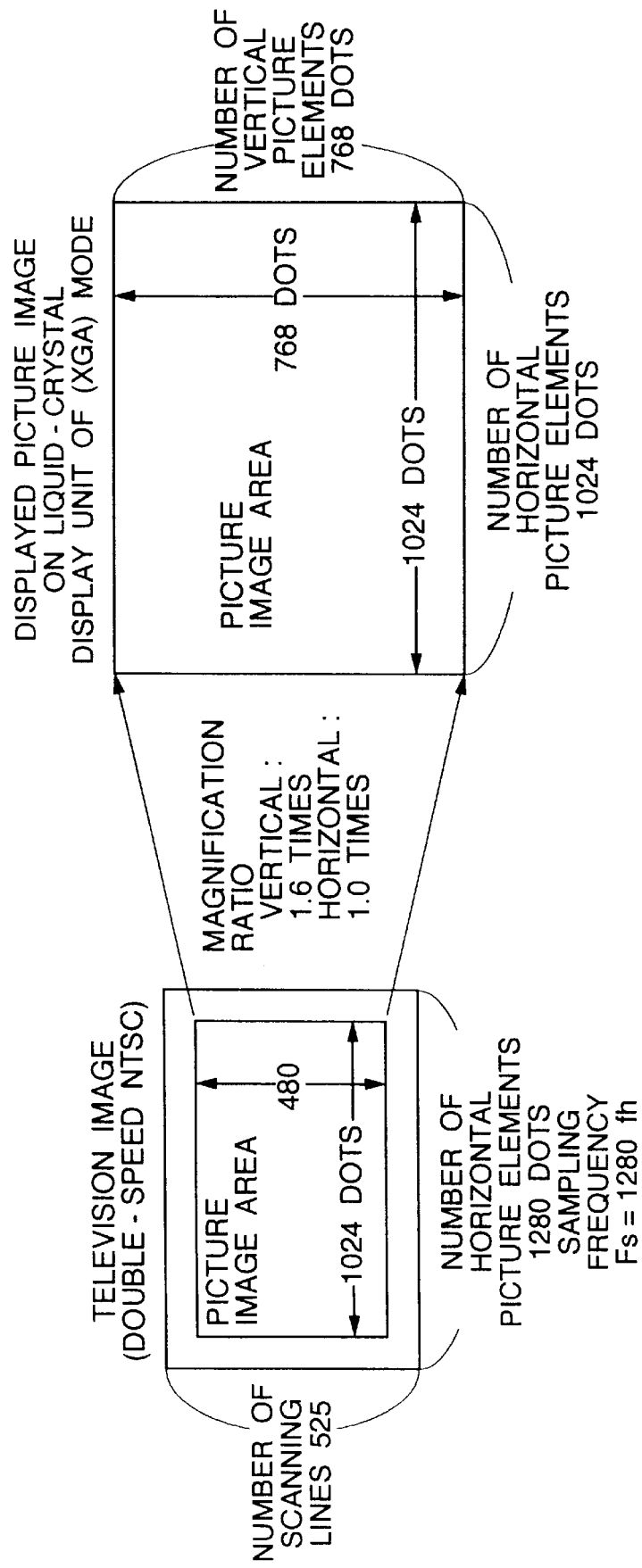
FIG. 7 is a diagram for explaining another example of horizontal magnification and vertical magnification when a double-speed NTSC television image is displayed on an XGA display unit by use of a video signal processing apparatus according to the present invention.

In this case, a value of 9/20 is set as the second reference value to be used by the PLL circuit 3, and values of 768/480 (that is, 1.6 times) and 1024/1024 (that is, 1 times) may be set as the vertical magnification ratio K1 and the horizontal magnification ratio K2 to be selected by the controller 7. Also in the case of such selection, as a result, the A/D converter 2 is supplied with a sampling frequency (1280×fh Hz) by which information included in the NTSC-system double-speed color television signal, and by vertical magnification and horizontal magnification executed by the vertically magnifying circuit 5 and the horizontally magnifying circuit 6 respectively, a picture image represented by the NTSC-system double-speed color television signal having a size which is suitable to its original predetermined display area (1024×480 dots) is magnified to a size which is suitable to the display screen (1024×768 dots) of the XGA-mode liquid-crystal display unit as shown in FIG. 7.

Figure 8:
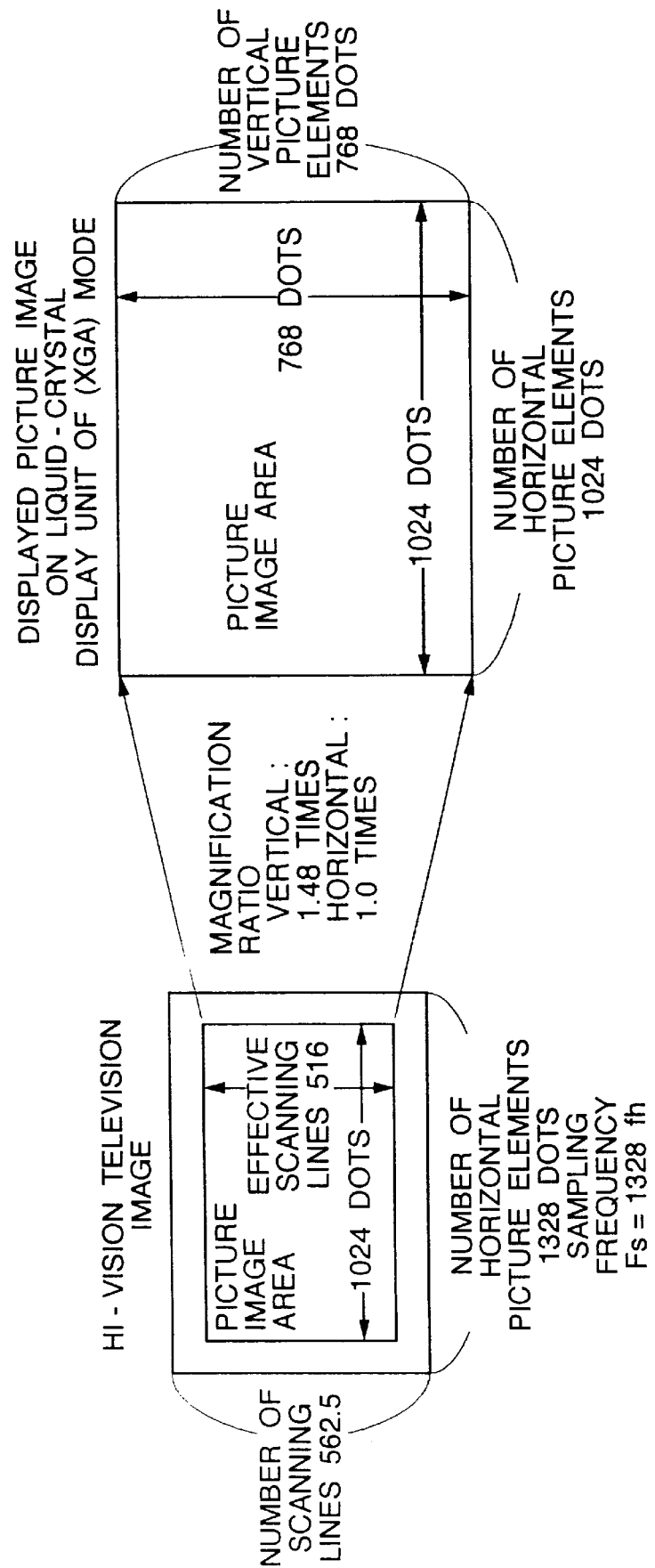
FIG. 8 is a diagram for explaining an example of horizontal magnification and vertical magnification when a Hi-Vision (MUSE) image is displayed on an XGA display unit by use of a video signal processing apparatus according to the present invention.
Figure 9:
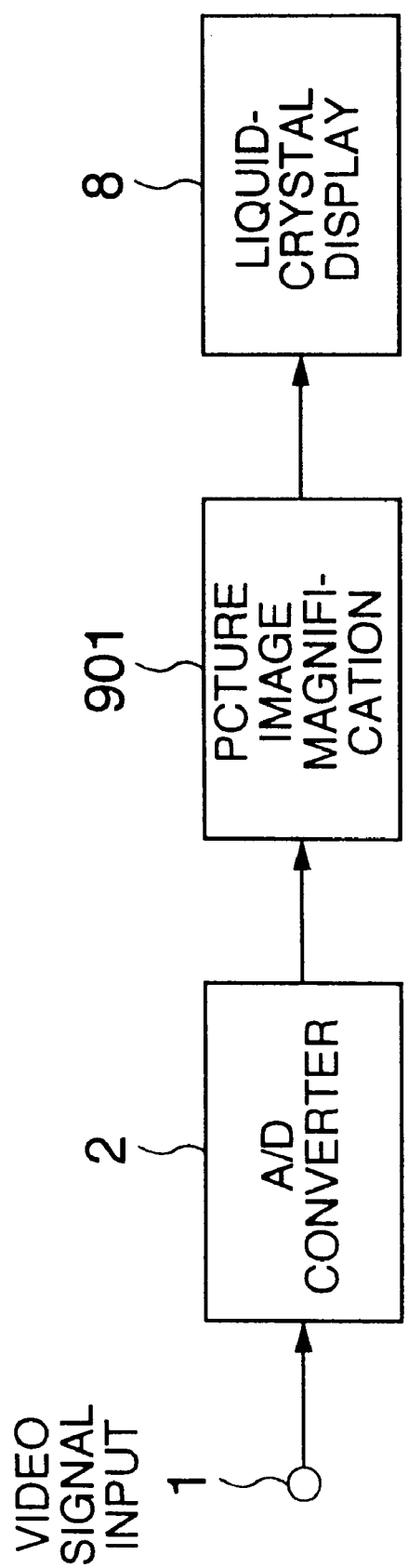
FIG. 9 is a conceptual diagram illustrating the configuration of a conventional video signal processing apparatus.

Further, in this case, instead of the video signal output apparatus outputting the NTSC-system double-speed color television signals, another video signal output apparatus outputting MUSE-system Hi-Vision video signals is connected to the video signal processing apparatus 9 in FIG. 1. When an identification signal C outputted from a predetermined external apparatus is inputted into the identification signal input terminal 4 thereafter, the PLL circuit 3 and the controller 7 recognize that the video signal B inputted into the video signal input terminal 1 has been changed to the MUSE-system Hi-Vision video signal on the basis of the identification signal C inputted into the identification signal input terminal 4. Consequently, the PLL circuit 3 selects a third reference value (usually 1/2) which is made to correspond to the transmission system "MUSE-system Hi-Vision video signal" of the video signal B which is being inputted at present, as the dividing ratio by which the reference frequency (usually 89.64 MHz) is divided. As a result, the optimum sampling frequency (1328×fh Hz) for digitally converting MUSE-system Hi-Vision video signals, that is, a sampling frequency by which information included in the original video signal will not be thinned out is newly supplied to the A/D converter 2. On the other hand, the controller 7 extracts, from the table provided in advance, the combination of the vertical magnification ratio K1 (768/516 times, that is, 1.48 times) and the horizontal magnification ratio K2 (1024/1024 times, that is, 1 time) which are made to correspond to the screen system "XGA mode" of the liquid-crystal display unit which is connected at present and the transmission system "MUSE-system Hi-Vision video signal" of the video signal B which is being inputted at present. Then, the controller 7 supplies the above-mentioned control commands D1 and D2 to the vertically magnifying circuit 5 at the timing newly calculated on the basis of the vertical magnification ratio K1 (1.48 times). Thereafter, the controller 7 supplies the above-mentioned control commands D3 and D4 to the horizontally magnifying circuit 6 at the timing newly calculated on the basis of the horizontal magnification ratio K2 (1 time). As a result, by vertical magnification and horizontal magnification executed by the vertically magnifying circuit 5 and the horizontally magnifying circuit 6, a picture image represented by the MUSE-system Hi-Vision video signal having a size which is suitable to its original predetermined display area (1024×516 dots) is magnified to a size which is suitable to the display area (1024×768 dots) of the XGA-mode liquid-crystal display unit as shown in FIG. 8. That is, a Hi-Vision image which is clear and has no sense of incompatibility is displayed on the XGA-mode liquid-crystal display unit even if the transmission system of the video signal B inputted therein is changed to the MUSE-system Hi-Vision video signal.

Thus, in this image display system, it is possible to perform proper digital conversion and proper magnification upon video signals of a desired transmission system. That is, it is possible to obtain an effect to display picture images represented by video signals of a desired transmission system properly and clearly.

Although the above-mentioned effect was described in the case of using an XGA-mode liquid-crystal display unit by way of example, it is possible to obtain an effect similar to that in the case where the XGA-mode liquid-crystal display unit is used even when a liquid-crystal display unit of another mode such as VGA mode or SVGA mode, is used.

As has been described above, by the video signal processing apparatus according to the present invention, it is possible to display picture images represented by video signals of a desired transmission system on a display unit of a desired screen system properly and clearly.

The present invention can be carried out in various forms other than the above embodiments without departing from its spirit and main features. Therefore, the above embodiments are mere examples of the present invention in every point, and should not be regarded as limitations. The scope of the present invention is stated in Claims. Further, any modifications and any alternations belonging to the scope equivalent to the scope of Claims is within the scope of the present invention.

What is claimed is:

1. A video signal processing apparatus comprising an analog-to-digital converter for sampling inputted video signals by a predetermined sampling frequency to convert the video signals into digital signals, and a picture image magnifying circuit for performing picture element interpolation upon output signals from said analog-to-digital converter to magnify the video signals vertically and horizontally, an output of said picture image magnifying circuit being supplied to a display unit, wherein said video signal processing apparatus further comprises:

(a) PLL circuit, connected to said analog-to-digital converter, for variably controlling a sampling frequency in accordance with an identification signal indicating a type of transmission system of said video signals and for outputting a resultant sampling frequency to said analog-to-digital converter; and (b) a controller connected to said picture image magnifying circuit, for controlling the picture element interpolation processing in said picture image magnifying circuit in accordance with the identification signal indicating the type of transmission system of said video signals, said controller controlling the picture element interpolation processing in a vertical direction of the video signals and the picture element interpolation processing in a horizontal direction of the video signals individually, by using a vertical magnification ratio and a horizontal magnification ratio which correspond to the type of transmission system of the video signals set on the basis of said identification signal.

2. A video signal processing apparatus according to claim 1, wherein
said PLL circuit produces the sampling frequency by frequency dividing a reference frequency phase-compared with the inputted video signals, the frequency division being performed by using a dividing ratio corresponding to the type of transmission system of the inputted video signals identified by said identification signal, and
said controller has a table recorded with vertical magnification ratios and horizontal magnification ratios corresponding to the transmission systems of the video signals and to screen systems of said display unit, and selects and sets the vertical magnification ratio and the horizontal magnification ratio corresponding to the type of transmission system of said video signal on the basis of said identification signal, and outputs a control command to said picture image magnifying circuit on the basis of the set vertical magnification ratio and the set horizontal magnification ratio.

3. A video signal processing apparatus according to claim 2, wherein
said picture image magnifying circuit includes a vertically magnifying circuit for magnifying the video signals vertically and a horizontally magnifying circuit for magnifying the video signals horizontally, and each of said vertically magnifying circuit and said horizontally magnifying circuit includes a field memory for delaying the video signals by one field, a line memory for delaying the video signals by one line, a first coefficient multiplier for multiplying one line of information of the video signals stored in said field memory by a first coefficient, a second coefficient multiplier for multiplying one line of information of the video signals stored in said line memory by a second coefficient, and an adder for adding respective outputs of said first and said coefficient multipliers; and
said controller outputs a first control command to said vertically and horizontally magnifying circuits for controlling the timing of writing/reading the video signals into/from said field memory and said line memory respectively, and outputs a second control command to said vertically and horizontally magnifying circuits for controlling the timing of switching the coefficients used by said first and second coefficient multipliers on the basis of the vertical magnification ratio and the horizontal magnification ratio selected from said table thereby to control said picture element interpolation processing.

4. A video signal processing apparatus according to claim 1, further comprising
an identification signal input terminal supplied with said identification signal and connected to said PLL circuit and to said controller.

5. A video signal processing apparatus according to claim 1, wherein
said controller selects 1.6 as said vertical magnification ratio and selects 1.6 as said horizontal magnification ratio in the case where said display unit has a number of vertical pixels of 768 dots and a number of horizontal pixels of 1,024 dots, and the inputted video signals are video signals from a personal computer, and a picture image area of the personal computer has a number of vertical pixels of 480 dots and a number of horizontal pixels of 640 dots.

6. A video signal processing apparatus according to claim 1, wherein
said controller selects 1.6 as said vertical magnification ratio and selects 1.4 as said horizontal magnification ratio in the case where said display device has a number of vertical pixels of 768 dots and a number of horizontal pixels of 1,024 dots, and the inputted video signals are television signals in conformity to double-speed converted NTSC standards, and a picture image area of a television has a number of vertical lines of 480 lines and a number of horizontal pixels of 728 dots.

7. A video signal processing apparatus according to claim 1, wherein
said controller selects 1.6 as said vertical magnification ratio and selects 1.0 as said horizontal magnification ratio in the case where said display device has a number of vertical pixels of 768 dots and a number of horizontal pixels of 1,024 dots and the inputted video signals are television signals in conformity with double-speed converted standards, and a picture image area of a television has a number of vertical lines of 480 lines and a number of horizontal pixels of 1,024 dots.

8. A video signal processing apparatus according to claim 1, wherein
said controller selects 1.48 as said vertical magnification ratio and selects 1.0 as said horizontal modification ratio in the case where said display device has a number of vertical pixels of 768 dots and a number of horizontal pixels of 1,024 dots, and the inputted video signals are Hi-Vision video signals, and a picture image area of a Hi-Vision has a number of vertical lines of 516 lines and a number of horizontal pixels of 1,024 dots.

9. A video signal processing apparatus comprising analog-to-digital converting means for sampling inputted video signals by a predetermined sampling frequency to convert the video signals into digital signals, and picture image magnifying means for performing picture elements interpolation processing upon output signals from said analog-to-digital converting means to magnify the video signals vertically and horizontally, an output of said picture image magnifying means being supplied to a display device, wherein said video signal processing apparatus further comprising:
(a) sampling frequency control means connected to said analog-to-digital converting means, for variably controlling a sampling frequency in accordance with an identification signal indicating the type of said video signals and for outputting a resultant sampling frequency to said analog-to-digital converting means; and
(b) control means connected to said picture image magnifying means, for controlling the picture element interpolation processing in said picture image magnifying means in accordance with the identification signal indicating the type of said video signals, and said control means controlling the picture element interpolation processing in a vertical direction of the video signals and the picture element interpolation processing in a horizontal direction of the video signals individually, by using a vertical magnification ratio and a horizontal magnification ratio which correspond to the type of the video signals set on the basis of said identification signal.

10. A video signal processing apparatus comprising analog-to-digital converting means for sampling inputted video signals by a predetermined sampling frequency to convert the video signals into digital signals, and picture image magnifying means for performing picture element interpolation processing upon output signals from said analog-to-digital converting means to magnify the video signals vertically and horizontally, an output of said picture image magnifying means being supplied to a display device, wherein said video signal processing apparatus further comprising:

control means connected to said picture image magnifying means, for controlling the picture element interpolation processing in said picture image magnifying means in accordance with a identification signal indicating the type of said video signals, said control means controlling the picture element interpolation processing in a vertical direction of the video signals and the picture element interpolation processing in a horizontal direction of the video signals individually, by using a vertical magnification ratio and a horizontal magnification ratio which are corresponding to the type of the video signals set on the basis of said identification signal.

* * * * *